UNITED STATES PATENT OFFICE.

THOMAS JEFFERSON ETHRIDGE, OF LONGVIEW, TEXAS.

METAL-COATING COMPOSITION.

1,379,542.  Specification of Letters Patent.  Patented May 24, 1921.

No Drawing.  Application filed May 24, 1920. Serial No. 383,933.

*To all whom it may concern:*

Be it known that I, THOMAS J. ETHRIDGE, a citizen of the United States, residing at Longview, in the county of Gregg and State of Texas, have invented certain new and useful Improvements in Metal-Coating Compositions; and I do declare the following to be a full, clear, and exact description of the invention, such as will enable others skilled in the art to which it appertains to make and use the same.

This invention relates to metal-coating compositions, and more specifically to an improved composition for forming a protecting coat on iron, steel and the like, to prevent rusting and corroding of the metal surfaces on which it is applied.

One object of this invention is to provide a metal coating composition of this character which, when applied to the interior and exterior surfaces of iron or other metal pipes, tanks, etc., will effectually and lastingly protect the coated surfaces against the detrimental effects of salt, alkali, acids, etc., and which is easily and cheaply produced by any person of ordinary ability.

Other objects and advantages will be pointed out or implied in the following details of description.

A very satisfactory painting or coating composition, for the purpose stated in the foregoing, consists of a mixture of the following ingredients in the proportions given, by weight, viz:—

| | |
|---|---|
| Asphalt | 30% |
| Black lead or graphite | 15% |
| Portland cement | 10% |
| Crude oil, or petroleum | 20% |
| Linseed oil | 5% |
| Gasolene | 15% |
| Turpentine | 5% |

However, in the absence of certain of these ingredients appropriate substitutes may be employed, and certain of the ingredients may be omitted, and the remaining combination of elements will produce a useful coating composition, though perhaps less efficient than if all the ingredients were used. For instance, a useful painting composition may comprise only the ingredients, asphalt, graphite, and crude oil; asphalt, graphite, Portland cement and crude oil; asphalt, graphite, Portland cement, crude petroleum and turpentine; or the graphite may be omitted or replaced by a substitute in one or more of the above examples. The invention is not limited to the exact proportions given in the above formula, and changes may be made within the scope of the inventive idea.

The manner of mixing or compounding the ingredients may be varied according to the attending circumstances or personal desires. When the ingredients have been thoroughly mixed, the composition is ready for immediate application, an ordinary paint brush being used for this purpose, in the ordinary way.

What I claim as my invention is:

1. A painting composition comprising asphalt, graphite, Portland cement, crude petroleum, linseed oil, gasolene and turpentine.

2. A painting composition comprising the following ingredients substantially in the proportions given by weight, viz., 30% asphalt, 15% graphite, 10% Portland cement, 20% crude petroleum, 5% linseed oil, 15% gasolene, 5% turpentine.

3. A painting composition comprising asphalt, graphite and crude oil.

4. A painting composition comprising asphalt, graphite, Portland cement, and oil.

5. A painting composition comprising asphalt, graphite, Portland cement, crude petroleum and turpentine.

In testimony whereof I have hereunto set my hand.

THOMAS JEFFERSON ETHRIDGE.